(No Model.) 2 Sheets—Sheet 1.
J. A. GRAHAM & E. J. BIRKETT.
HARVESTER TRUCK.
No. 602,030. Patented Apr. 5, 1898.
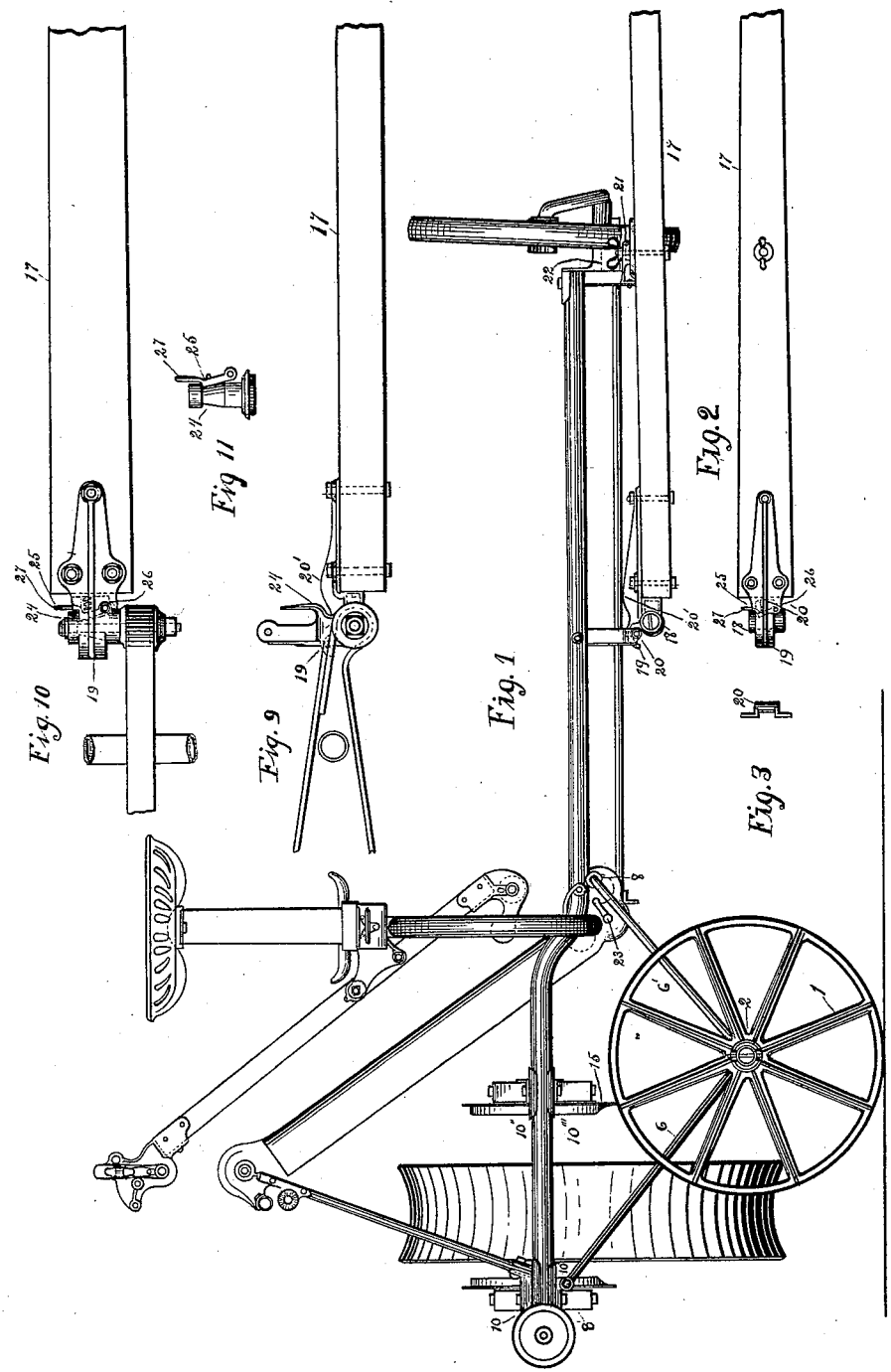
Witnesses
Harold Flater
J. O. Holmes
Inventors
James A. Graham
Edward J. Birkett
By Their Attorney E. W. Burgess (No Model.) 2 Sheets—Sheet 2.
J. A. GRAHAM & E. J. BIRKETT.
HARVESTER TRUCK.
No. 602,030. Patented Apr. 5, 1898.
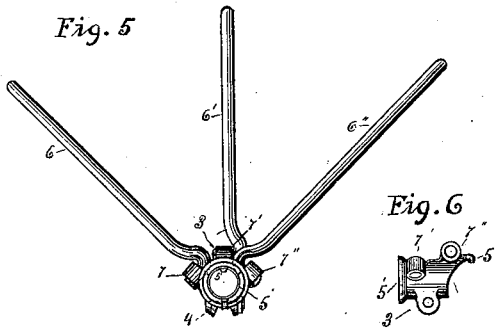
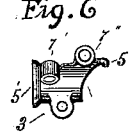
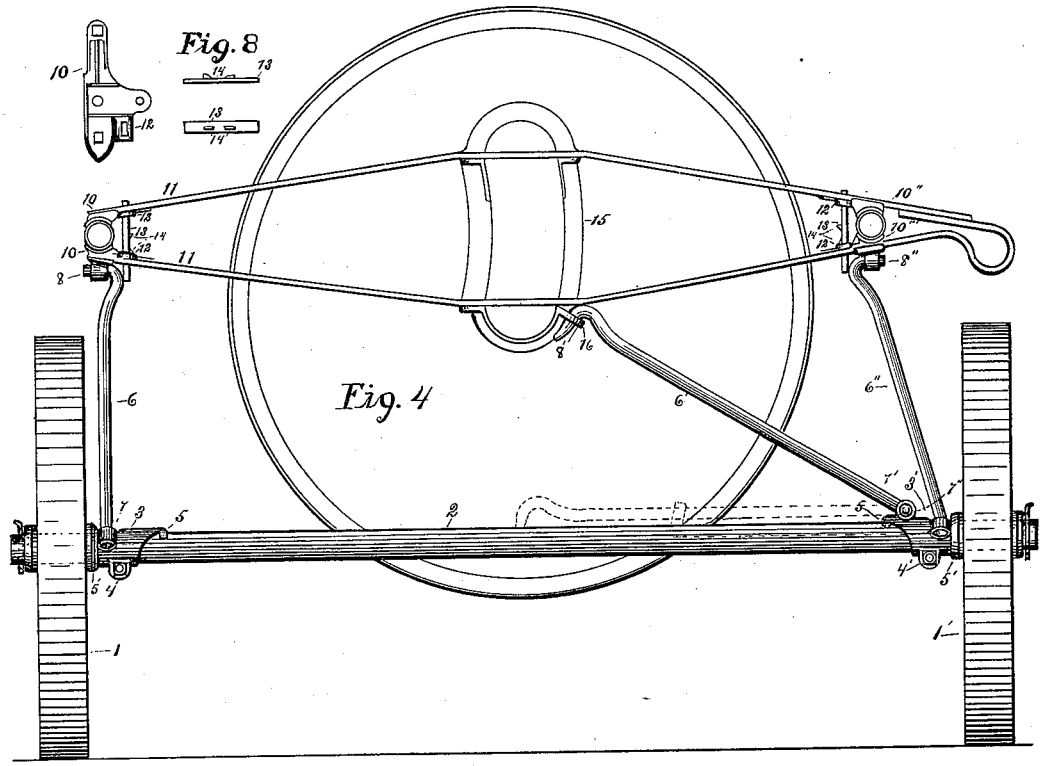
Witnesses
Harold Slater
I. O. Holmes
Inventors
James A. Graham
Edward J. Birkett
By Their Attorney E. W. Burgess

UNITED STATES PATENT OFFICE.

JAMES A. GRAHAM AND EDWARD J. BIRKETT, OF MILWAUKEE, WISCONSIN, ASSIGNORS TO THE MILWAUKEE HARVESTER COMPANY, OF SAME PLACE.

HARVESTER-TRUCK.

SPECIFICATION forming part of Letters Patent No. 602,030, dated April 5, 1898.

Application filed June 4, 1897. Serial No. 639,402. (No model.)

*To all whom it may concern:*

Be it known that we, JAMES A. GRAHAM and EDWARD J. BIRKETT, citizens of the United States, residing at Milwaukee, in the county of Milwaukee and State of Wisconsin, have invented certain new and useful Improvements in Harvester-Trucks, of which the following is a specification.

Our invention relates to improvements in harvester transportation-trucks; and the objects of our improvements are to provide a truck upon which the article to be transported may be easily and quickly loaded, one that will be simple and strong in construction, and one in which the parts may be folded together in close compass for shipment.

Another feature of our invention is the means for attaching the draft-pole to the harvester-frame when used in operating the machine and also to the platform when used in connection with the truck.

We attain these objects by the mechanism illustrated in the accompanying drawings, in which—

Figure 1 is a rear end view of our truck supporting a harvester. Fig. 2 is a view of the harvester-pole detached from the machine. Fig. 3 is a detail of a draw-clip the function of which will be shown later. Fig. 4 is a side view of the truck and attaching parts. Figs. 5 and 6 are detail parts. Figs. 7 and 8 are details of the latching mechanism. Fig. 9 is a side view of the pole and connections. Fig. 10 is a top view of Fig. 9. Fig. 11 is a detail of the pole-securing mechanism.

Similar numerals refer to similar parts throughout the several views.

1 and 1' are the truck-wheels; 2, the axle, which we prefer to make of round pipe.

3 and 3' are clamping-clips attached to the axle by the clamping-bolts 4 and 4'. These clips are also provided with pintle portions 5, adapted to be bent inward into a hole in the axle-pipe, and thus prevent displacement of said clips. They are also formed at their outer ends with a recess 5' for the reception of the wheel-hub.

6, 6', and 6" are supporting links or braces having pivotal connection with the clamping-clips, as shown at 7, 7', and 7", and are provided at their opposite ends with hook portions adapted to hook into parts 8, 8', and 8" of the harvester-frame. These sustaining-links are bent in the form shown in Fig. 5 at their lower ends and, as shown in Fig. 4, at their upper ends to give additional stiffness.

10, 10', 10", and 10''' are truss-clips saddling the sill-pipes of the harvester-frame and adapted to receive the truss members 11 and 11' and provided with loop portions 12 for the reception of the sliding latch-pieces 13, the latch 13 being provided with step portions 14 to abut against the sides of the loop portions to limit the movement of the latch 13. A swinging gravity-latch 23, Fig. 1, is provided for retaining the link in position at the rearward grainward side, and a similar latch retains the upper end of the forward grainward sustaining-link. In Fig. 4 we have shown the fifth brace pivoted to the forward axle-clip and hooking into an ear integral with the segment-rack between the two members of the frame-truss. We prefer this construction because it puts a tensile strain upon the link. We have shown the lower ends of the links as being riveted into the bearings upon the clamping-clips, and in practice we prefer this method; but they may be held in place by a split key. These braces are pivoted to the axle-clips in bearings that will allow them to be turned down to a position approximately parallel with the axle for shipping purposes, as shown by the dotted lines in Fig. 4.

15 is a segment-rack connecting the two truss-members 11 and 11' and provided at its lower end with an ear 16, adapted to receive the hooked end 8' of supporting-link 6'.

17 is the harvester-pole; 18 the end casting, provided with the hooked portion 19, adapted to hook upon the draw-clip 20 and the raised portion 20' to abut against the bottom of the platform and prevent the hook portion 19 from becoming detached when the platform is lowered.

21 is a bracket secured to the grain-wheel end of the platform and to which is secured the pole 17 by bolt and winged nut 22.

24, Fig. 11, is a draft-thimble with an annular rim and shoulder at its larger end that is adapted to engage with the eye formed upon the forward portion of the lower member of the truss-frame 11, Fig. 4, and shown in detail in Figs. 9 and 10. Near its opposite end it is reduced in diameter, and has a shoulder formed upon it with which the spring-actuated pivoted latch 25, pivoted to the end casting 18 at 26, engages for the purpose of locking the pole in position upon the draft-thimble, as shown in Fig. 10. The pivoted latch 25 is provided with a shoulder portion that abuts against the shoulder formed upon the draft-thimble 24, and a thumb-piece 27, that extends beyond the part 18 for the convenience of the operator when detaching the pole. Any form of spring may be used to press the latch against the draft-thimble. In practice we prefer to use a coiled spring, as shown in Fig. 10.

The operation of loading the harvester upon our improved truck is as follows: The machine is first raised as far as possible upon its carrying-wheel and then tipped upon the carrying-wheel by elevating the grain-wheel end. The truck is then brought into position and the braces or supporting-links are hooked into the receptacles provided for them, and the latches being allowed to drop down the links are securely retained in place. The pole is then removed from the draft-thimble at the front of the harvester by unlocking the latch 25 and withdrawing the part 18 from said thimble. The hook portion 19 of the casting 18 is then hooked upon the draw-clip 20, beneath the harvester-platform. The grain-wheel end of the harvester is then lowered until bracket 21 may be secured to the pole. The lowering of the grain-wheel end of the harvester around the truck-wheels as a pivot lifts the carrying-wheel from the ground, and the weight is supported by the truck.

It will be observed by reference to Fig. 1 that the supporting-links are attached to the harvester-frame at points directly beneath the foot of braces supporting the harvester elevator-frame, thus preventing undue strain upon the supporting-sills of the harvester, as would follow if the weight was supported at a point directly above the axle of the truck.

We are aware that braces or links have been used to hold the truck in position under a harvester and that such braces have been prevented from being unhooked accidentally by latches and have been adapted to be folded close to the axle for shipping purposes; but we are not aware that said links or braces have been adapted to receive and sustain the entire weight to be transported without the addition of any other supporting member.

What we claim, and desire to secure by Letters Patent, is—

1. In a harvester-truck, the combination of the axle and wheels, with sustaining link-braces having pivotal connection with the axle and adapted to be hooked to portions of the harvester-frame in a manner to sustain its entire weight.

2. In a harvester-truck, the axle and wheels, the clips clamped to the axle and provided with bearings for the hook-shaped ends of the sustaining-links.

3. In a harvester-truck, the combination of the axle and the clamping-clips provided with bearings for the reception of the hook-shaped ends of the sustaining-links, and the pintle portion projecting into the axle, with the clamping-bolts, substantially as specified.

4. In a harvester-truck, the axle provided with means for attaching pivotal sustaining-links thereto.

5. In a harvester-truck, the axle provided with means for attaching pivotal sustaining-links thereto, said links adapted to swing down approximately parallel with said axle, substantially as shown and described.

6. In a harvester-truck attachment, a draft-pole provided at its rear end with a supplemental draft connection, said draft-connection portion provided with a hook-shaped portion, and an upwardly-projecting portion, in combination with a bracket affixed to the under side of the harvester-platform and into which the hook-shaped portion of the draft connection is adapted to seat itself, and a means for securing the draft-pole to the grain-wheel end of the harvester-platform, substantially as described.

7. In a harvester-truck, sustaining-supports having connection with the axle near the supporting-wheels, and diverging as they extend upward and provided with means for attaching their upper ends to the harvester-frame and adapted to sustain the entire weight of said frame, substantially as specified.

8. In a harvester-truck, sustaining-supports provided at their lower ends with hook-shaped portions, clips clamped to the axle and adapted to receive the hook-shaped ends of the sustaining-supports and provided with a shouldered recess for the reception of the wheel-hub, substantially as shown and specified.

9. In a harvester-truck, sustaining-supports having pivotal connection with the axle and diverging as they extend upward and provided with hook-shaped ends adapted to connect with a part secured to the frame of the part to be supported in a manner to sustain the entire weight of said part, and means for securing them in said parts, substantially as described.

10. In a harvester-truck, the combination of the axle and wheels, the sustaining-links adapted to connect with fixed parts of the harvester-frame, and connecting-clips between the members of the truss-frame and the sills, said clips provided with loop portions for the reception of a sliding latch to lock said sustaining-links in operative position, substantially as shown and described.

11. In a harvester-truck, the combination of the axle and wheels, the sustaining-links, having hook-shaped ends to connect with fixed parts of the harvester-frame, and other hook-shaped ends having pivotal connection with a part clamped to the truck-axle, with pivotal, gravity-latches to retain the upper hook-shaped ends of said sustaining-links in operative position, substantially as shown and described.

12. In a harvester-pole attachment, the combination of a pole, a draft-casting connected thereto, a draft-stud connected with the harvester-frame, said draft-stud provided with an annular groove or collar, and a yielding latch pivoted to the draft-casting and engaging with the annular groove or collar, substantially as described.

13. In a harvester-pole attachment, the combination of a pole, a draft-piece connected thereto, said draft-piece provided with the raised portion 20', a bracket secured to the harvester-platform, and said draft-piece provided with a hook portion adapted to connect with the bracket, substantially as shown and described.

14. In a harvester-pole attachment, the combination of a pole, a draft-casting connected thereto, a latch pivoted to the draft-casting, a spring acting upon the latch, a draft-stud secured to the harvester-frame, said draft-stud provided with a notch or shoulder portion adapted to engage with the spring-pressed latch whereby the said draft-stud and the said draft-casting are maintained in pivotal relation, substantially as described.

JAMES A. GRAHAM.
EDWARD J. BIRKETT.

Witnesses:
LOUIS O. ZEDLER,
B. C. WAIT.